No. 762,674. PATENTED JUNE 14, 1904.
H. AUSTIN.
DIFFERENTIAL OR DOUBLE DRIVING GEAR.
APPLICATION FILED NOV. 14, 1902.
NO MODEL.
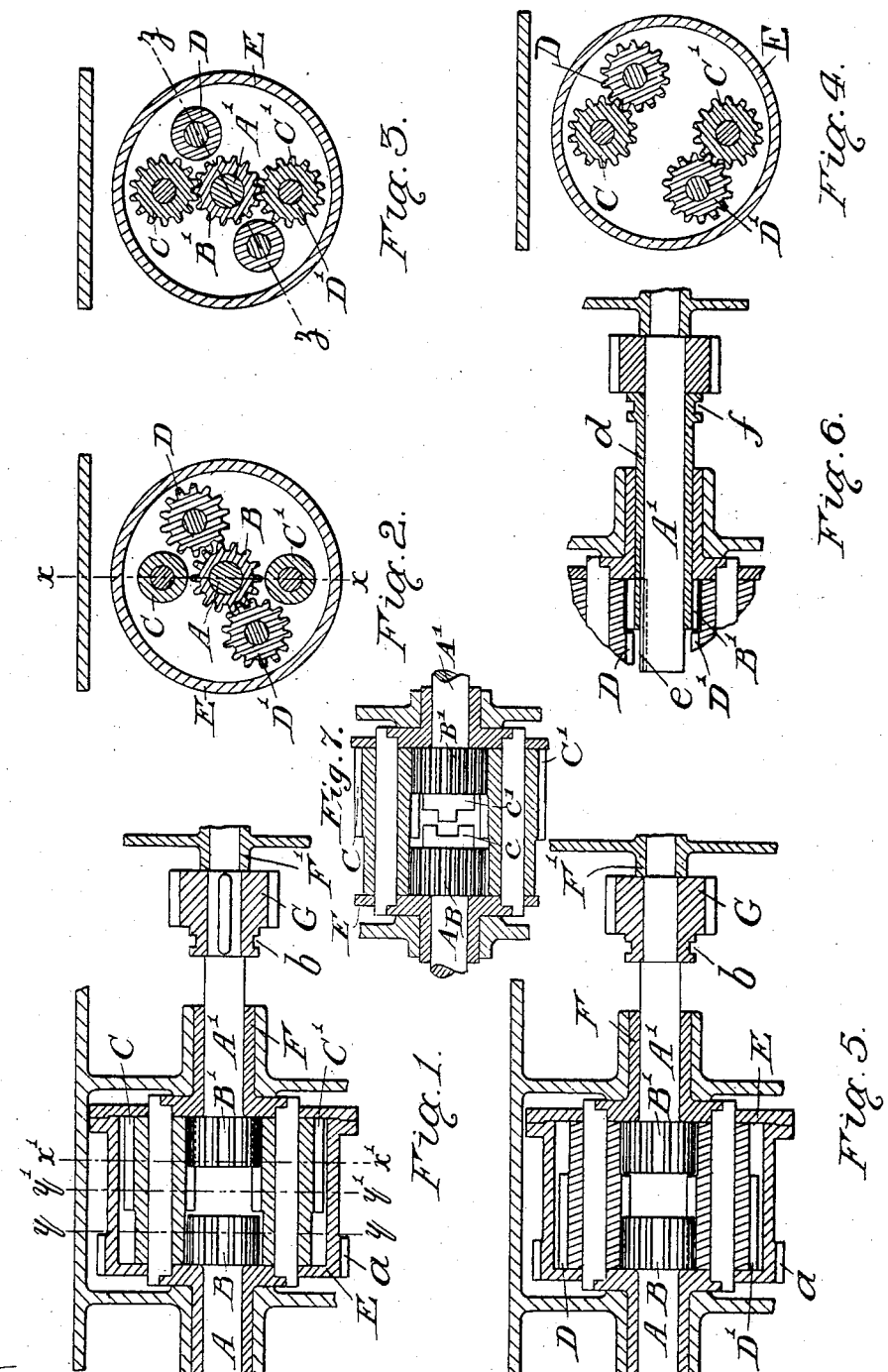
Witnesses:
Inventor:
Herbert Austin No. 762,674.

Patented June 14, 1904.

UNITED STATES PATENT OFFICE.

HERBERT AUSTIN, OF ERDINGTON, ENGLAND.

DIFFERENTIAL OR DOUBLE DRIVING-GEAR.

SPECIFICATION forming part of Letters Patent No. 762,674, dated June 14, 1904.

Application filed November 14, 1902. Serial No. 131,321. (No model.)

*To all whom it may concern:*

Be it known that I, HERBERT AUSTIN, engineer, a subject of the King of Great Britain, residing at Erdington, near Birmingham, England, have invented certain new and useful Improvements in Differential or Double Driving-Gear for Use in Driving Self-Propelled Road-Vehicles, of which the following is a specification.

This invention relates to differential or double driving-gear (sometimes known as "balance-gear") of the type in which the wheels of the gear which are upon the driven axles are formed with parallel teeth and are geared together through the medium of pinions, which mesh with one another and which themselves mesh, respectively, with the wheels which are carried by the axles. In using differential gear, whether of this spur-gear type or of the more ordinary type—that is to say, the type in which bevel-wheels are used for heavy road-vehicles—the inconvenience is sometimes experienced that when a vehicle is in soft ground one of the driven road-wheels is liable to slip, which prevents the vehicle from being driven; and the invention has for its object means by which the type of gear in which wheels with parallel teeth are geared together in the manner above described may be adapted to be locked at will, so that the axles must revolve together, thereby insuring that the vehicle may be readily driven over soft ground.

The above object is accomplished according to this invention in the manner illustrated by the drawings herewith, of which—

Figure 1 is a longitudinal section taken along the center of the gear, being taken in the plane indicated by line $x\ x$ of Fig. 2. Fig. 2 is a transverse section of the gear, taken in the plane indicated by line $y\ y$ of Fig. 1, and shows only the parts which are upon the plane of the section. Fig. 3 is a corresponding view to Fig. 2, but is taken in the plane indicated by line $x'\ x'$ of Fig. 1. Fig. 4 is a corresponding view to Figs. 2 and 3, but is taken in the plane indicated by line $y'\ y'$ of Fig. 1. Fig. 5 is a view corresponding to Fig. 1, but is taken in the plane indicated by line $z\ z$ of Fig. 3, as the section would appear when such plane is vertical; and Fig. 6 shows in longitudinal section a modification of certain parts of the mechanism. Fig. 7 is a sectional view taken in the same plane as Fig. 1 and illustrating another modified construction.

Referring primarily to Figs. 1 to 5, A A' are the driven shafts or axles of the balance-gear. These axles are alined and have fixed on their respective adjacent and inner ends spur-wheels B and B'. The teeth of the wheel B' mesh at all times with the teeth of two spur-pinions C C', Fig. 3, and the teeth of the wheel B mesh at all times with the teeth of two spur-pinions D D', Fig. 2. The faces of the pinions C C' and D D' are much broader than the faces of the wheels B B', as seen in Figs. 1 and 5, and the teeth of the pinions C and C' mesh, respectively, at all times with those of the pinions D and D', Fig. 4. The pinions C C' D D' are mounted in and carried by a drum or carrier E, which is journaled concentrically with the axles A A', and this drum is driven from the motor through the medium of suitable sprocket-teeth $a$ on the drum or in any convenient manner. The pinions C C' do not mesh with the wheel B, nor do the pinions D D' mesh with the wheel B', and thus it will be seen that as the drum or casing E is rotated the axles A A' may revolve at different rates of speed if a greater resistance is offered to the turning of one of them than to the turning of the other, as is well understood in connection with this class of gear. This very useful result, however, of the employment of differential or balance gear with self-propelled road-vehicles involves the inconvenience above referred to that in soft ground one of the driving road-wheels is liable to slip, thus preventing the driving of the vehicle, and the special purpose of this invention is to enable the gear to be locked at will to prevent either of the axles A A' from revolving faster or slower than the other. To effect this purpose, one of the axles—namely, the axle A'—is adapted to be slid endwise within its bearings F F', so that its wheel B' may be moved inward to mesh also with the pinions D D'. When the axle A' has thus been moved inward, it will be obvious that the two axles A A' are locked together and will revolve as a single axle. The axle A' may be moved inward in any convenient manner—such as through the medium of a groove $b$ around the boss of a pinion G, sprocket-wheel, or the like, from which the power of the axle A' is given off to a driving road-wheel. Both axles A A' may of course be adapted to be moved inward, so that the wheel B' may mesh with the pinions D D' and the wheel B mesh with the pinions C C'; but this is not at all required and would obviously add unnecessary complication.

Fig. 6 shows a modification of the invention, in which the wheel B' is rigid with a sleeve $d$, which is slidingly mounted on the axle A'. The sleeve forms the inner journal of the axle and drives the axle through a feather-key $e$. The sleeve may be slid endwise of the axle through the medium of a groove $f$ around the outer end thereof to move the wheel B' into and out of engagement with the teeth of the wheels D D' in lieu of moving the axle A' endwise for such purpose.

Fig. 7 illustrates another locking means. In this construction the adjacent or inner ends of the alined axles A and A' are provided, respectively, with clutch members $c$ and $c'$, which are adapted to engage or interlock when the shaft A' is moved in for locking. As the wheels B B' are non-rotative on the respective axles, it is obviously not important whether the clutch members form parts of the said wheels or of the axles.

In differential or balance gear it is usual to drive the toothed wheel on the inner end of each axle at opposite points around it for the sake of smoothness of running, and this method is shown in the illustrations filed herewith. It will be obvious, however, that only the pinions C and D, (or alternatively the pinions C' and D',) which mesh each with one of the wheels, respectively, and which mesh together, are really essential, though the double arrangement is greatly preferred.

Having fully described my invention, what I claim, and desire to secure by Letters Patent, is—

1. A differential driving-gear for the purpose specified, having driven axles, a rotary carrier journaled concentrically with said axles and embracing their inner ends, means within the carrier through which the axles are compelled to rotate together, said means being put in operation by a movement of a part of the gear within such carrier, and means for imparting such movement from the exterior of the carrier, substantially as set forth.

2. In a differential driving-gear for the purpose specified, the combination with the alined driven axles, and spur gear-wheels mounted non-rotatively on the adjacent inner ends of the respective axles, of a rotary carrier journaled concentrically with said axles and embracing their inner ends, and spur-pinions in said carrier through which the motion of the carrier is imparted to the wheels, a part of said gear being movable longitudinally within said carrier and the gear having parts within said carrier which engage when said part thereof is so moved, substantially as set forth.

3. In a differential driving-gear for the purpose specified, the combination with the alined driven axles, spur-wheels on the inner, adjacent ends of said axles, and a rotary carrier journaled concentrically with said axles and embracing their inner ends, of relatively broad-faced pinions mounted in said carrier and gearing together, said pinions also gearing respectively with the said wheels on the axles, but each pinion gearing normally with only one of said wheels, and means for putting the wheels on the axles both in gear with the same pinion, whereby the parts are interlocked and the axles prevented from rotating independently, substantially as set forth.

4. In a differential driving-gear for the purpose specified, the combination with the alined driven axles, the spur-wheels mounted on the respective inner and adjacent ends of the axles, and a rotary carrier journaled concentrically with said axles and embracing the wheels on the ends of the latter, of broad-faced spur-pinions mounted in said carrier and gearing with each other, one of said pinions gearing normally with the wheel on one axle and the other normally with the wheel on the other axle, one of said axles being slidably mounted in its bearings so that it may be moved endwise, whereby the spur-wheel on said slidable axle may be made to gear with both of said pinions and thereby lock the axles against independent rotation, substantially as set forth.

In witness whereof I have hereunto signed my name, this 5th day of November, 1902, in the presence of two subscribing witnesses.

HERBERT AUSTIN.

Witnesses:
ROBERT G. GROVES,
THOMAS MARSTON.